(12) United States Patent
Eldemerdash et al.

(10) Patent No.: US 10,749,718 B2
(45) Date of Patent: Aug. 18, 2020

(54) SYSTEM AND METHOD FOR MODULATION CLASSIFICATION USING SIGNAL GRAPHS

(71) Applicant: Allen-Vanguard Corporation, Ottawa (CA)

(72) Inventors: Yahia A. Eldemerdash, St. John's (CA); Octavia A. Dobre, St. John's (CA); Oktay Ureten, Ottawa (CA); Trevor Noel Yensen, Ottawa (CA)

(73) Assignee: Allen-Vanguard Corporation, Ottawa (CA)

( * ) Notice: Subject to any disclaimer, the term of this patent is extended or adjusted under 35 U.S.C. 154(b) by 0 days.

(21) Appl. No.: 16/022,623

(22) Filed: Jun. 28, 2018

(65) Prior Publication Data

US 2020/0228192 A1 Jul. 16, 2020

Related U.S. Application Data

(60) Provisional application No. 62/526,561, filed on Jun. 29, 2017.

(51) Int. Cl.
  *H04L 27/00* (2006.01)
  *H04B 1/66* (2006.01)

(52) U.S. Cl.
  CPC .......... *H04L 27/0012* (2013.01); *H04B 1/66* (2013.01)

(58) Field of Classification Search
  CPC ............................. H04L 27/0012; H04B 1/66
  USPC ...................................................... 375/141
  See application file for complete search history.

(56) References Cited

U.S. PATENT DOCUMENTS

2012/0025782 A1 10/2012 Fam et al.

FOREIGN PATENT DOCUMENTS

| EP | 0544991 | 6/1993 |
| EP | 1083716 | 3/2001 |
| GB | 2540649 | 1/2017 |
| WO | 2017/058966 | 4/2017 |

OTHER PUBLICATIONS

IEEE Global Communications Conference, GLOBECOMM, 2016, Dec. 4, 2016, "Explore the adequate and concise information from communication signals in terms of graphs", Yan Kun et al.
IEEE Signal Processing Magazine, arxiv.org, Cornell University Library, Mar. 10, 2013, "The emerging field of signal processing on graphs: Extending high-dimensional data analysis to networks and other irregular domains", Shuman D. et al.
IEEE Communications Letters, vol. 21, No. 1, Jan. 2017, "Innovative robust modulation classification using graph-based cyclic-spectrum analysis", Yan Xiao et al.

*Primary Examiner* — Leila Malek
(74) *Attorney, Agent, or Firm* — Elan IP Inc.

(57) ABSTRACT

This invention relates system for classifying a modulation format of a communication signal. The system includes a receiving antenna system, to receive the communication signal, a preprocessing module, to evaluate a Fourier transform of a plurality of samples of the received communication signal, normalize each discrete sample of the Fourier transform, quantize each normalized sample based on a number of quantization levels (Q), a graphical analyzer to construct a undirected graph by tracing amplitude of the each quantized sample; and a classification module to extract one or more modulation classification (MC) features from the undirected graph; and to determine the modulation format of the received communication signal based on the extracted MC features.

18 Claims, 15 Drawing Sheets

SYSTEM AND METHOD FOR MODULATION CLASSIFICATION USING SIGNAL GRAPHS

(1) FIELD OF THE INVENTION

The present invention generally relates to the field of signal processing in wireless communications. The present invention particularly relates to a method and system for modulation classification of radio communication signals using signal graphs.

(2) BACKGROUND OF THE INVENTION

Modulation classification (MC) plays an important role in numerous military, civilian and commercial applications such as electronic warfare, spectrum surveillance, software defined radio (SDR) and cognitive radios. For example, SDRs that can detect, communicate or jam a variety of communication standards require automatic recognition of the signal modulation employed when no prior knowledge of the incoming signal is available to perform their function. Generally, MC is challenging task in a non-cooperative environment, where various disturbing factors such as multipath propagation, frequency-selectivity and time-varying nature of the channel exists.

Typically, two classes of MC algorithms exist, likelihood-based (LB) and feature-based (FB) methods. LB algorithms include a likelihood function performed on the received signal, and a decision algorithm performed by comparing a likelihood ratio against a threshold. Solutions offered by LB algorithms offer a high level of classification performance. However, the solutions suffer from implementational complexity, and sensitivity to model mismatches such as frequency offset, thereby making LB algorithms unpreferrable in realistic applications. On the other hand, the FB methods are more suitable for practical systems as they are simpler to implement and more robust to model mismatches. Although the FB methods are not optimal, with appropriate design a near-optimal performance is achievable.

New generation communication systems are increasingly deploying Multiple-input multiple-output (MIMO) antenna systems due to increased data rates and robust communications in multipath fading channels. While several techniques have been deployed for MC of signals in Single-Input Single-Output (SISO) systems, only studies have considered MC algorithms for MIMO systems in fading channels. For example, the following prior art are provided for their supportive teachings and are all incorporated by reference. Prior art document, H.-C. Wu, M. Saquib, and Z. Yun, "Novel automatic modulation classification using cumulant features for communications via multipath channels," IEEE Trans. Wireless Communication, vol. 7, pp. 3098-3105, Aug. 2008 (https://ieeexplore.ieee.org/document/4600222/), discloses the use of fourth-order cumulant estimators for automatic modulation classification (AMC) of BPSK and QPSK signals over an additive white Gaussian noise channel. Further, the prior art, includes a nearly minimum-variance estimator leading to robust AMC features in a wide variety of signal-to-noise ratios and without having a priori channel information. However, the disclosed prior art is applicable to SISO systems only and cannot be deployed in communications involving MIMO antenna systems.

Another prior art document, V. D. Orlic and M. L. Dukic, "Automatic modulation classification algorithm using higher-order cumulants under real-world channel conditions," IEEE Commun. Lett, vol. 13, pp. 917-919, December 2009 (https://www.researchgate.net/publication/220303345_Automatic_Modulation_Classification_Algorithm_Using_Higher-Order_Cumulants_Under_Real-World_Channel_Conditions), describes use of an AMC algorithm for use in multipath fading channels, based on normalized sixth-order cumulants as MC features. The prior art MC algorithm achieve much better classification accuracy in distinguishing BPSK from complex-valued modulation techniques. However, disclosed prior art cannot be used in MIMO systems.

Another prior art document, M. Marey and O. A. Dobre, "Blind modulation classification algorithm for single and multiple-antenna systems over frequency-selective channels," IEEE Signal Process. Lett., vol. 21, pp. 1098-1102, September 2014, describes a blind modulation classification (MC) algorithm applicable to SISO and MIMO systems operating over frequency-selective channels. A correlation-based approach is proposed in the disclosed prior art, where functions of received signals for certain modulation formats exhibit peaks at a set of time lags, a result which is exploited as a discriminating feature. However, the disclosed prior art technique suffers from high sensitivity to frequency offset and requires a long observation interval to achieve desirable performance.

Another, prior art document U.S. Pat. No. 6,934,342 B1 "Automatic Modulation Type Discrimination Apparatus and Automatic Modulation Type Discrimination Method Capable of Discriminating Plural Kinds of Modulation Types", discloses an AMC technique for detecting the modulation of a received signal. The disclosed technique involves, extraction of a symbol clock and an extension of a signal symbol from the received signal for extracting a characteristic of its amplitude distribution. Based on the extracted characteristic of the amplitude distribution, it is determined whether the reception signal is a 16 QAM signal and an M-ary QAM signal of multi-level exceeding 16-levels or any other signal. Several backtracking and preprocessing of the received signal involved in the disclosed process makes the process time consuming and computationally complex.

There is a need for an alternate method and system for detecting MC in multipath fading channels for both SISO and MIMO systems. Further, the alternate method and system must be computationally less complex and less time consuming. Accordingly, an alternate method and system for MC of signals in communication systems is proposed.

(3) SUMMARY OF THE INVENTION

In view of the foregoing disadvantages inherent in the known methods of modulation classification of radio communication signals in multipath fading channels used by SISO and MIMO systems in the prior art, the present invention provides an alternate method and system for MC of signals based on features extracted over short observation internals from the radio communication signal. As such, the general purpose of the present invention, which will be described subsequently in greater detail, is to provide a discriminating feature for classification that is extracted from a graph representation of a Fourier transform of the bth power of samples of the radio communication signal, where b is a positive integer.

An object of the invention is to provide a method for classifying the modulation of a communication signal, received by a receiving antenna system in a communication network. A Fourier transform of a plurality of samples of the received communication signal is evaluated by a preprocessing module. Each discrete sample of the Fourier transform is normalized and quantized based on several quantization levels(Q). Further, an undirected graph is constructed by a graphical analyzer by tracing the amplitude of each quantized sample. Furthermore, one or more modulation classification (MC) features is extracted by a classification module from the undirected graph; and the modulation format of the received communication signal is determined based on the extracted MC features.

It is another object of the invention to identify a vertex of the undirected graph by an amplitude of a quantized sample and an edge of the undirected graph by a transition between amplitudes of a pair of consecutive quantized samples.

It is another object of the invention to maintain an edge between a pair of vertices by a probability $p > (1-\varepsilon) \ln(Q)/Q$, wherein E is greater than or equal to a null value.

It is another object of the invention to include several edges of the constructed undirected graph by a binomial distribution with a probability distribution function of It is another object of the invention to construct several undirected graphs based on several receiving antennas in the receiving antenna system.

It is another object of the invention to enable classification of the modulation format of the communication signal in any type of the receiving antenna system such as a single input single output (SISO) system and a multiple input multiple output (MIMO) system.

It is another object of the invention, to extract by a classification module, one or more modulation classification (MC) features from the undirected graph such as a graph connectivity.

It is another object of the invention, to determine by the classification module, the modulation format of the received communication signal by classifying the modulation format into at least one predefined modulation format based on the extracted graph connectivity and a formulated binary hypothesis. The predefined modulation format may include one of a Binary Phase Shift Keying (BPSK), a Quadrature Phase Shift Keying (QPSK), a Frequency Shift Keying (FSK), and an 8 Phase Shift keying (8PSK).

It is another object of the invention, to select, by the classification module, a hypothesis H0, when the graph connectivity is positive, wherein a positive value of the graph connectivity indicates the graph is connected; and to select a hypothesis H1, when the graph connectivity is negative, wherein a negative value of the graph connectivity indicates the graph is not connected.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

These together with other objects of the invention, along with the various features of novelty which characterize the invention, are pointed out with particularity in the disclosure. For a better understanding of the invention, its operating advantages and the specific objects attained by its uses, reference should be had to the accompanying drawings and descriptive matter in which there are illustrated preferred embodiments of the invention.

(4) BRIEF DESCRIPTION OF THE DRAWINGS

The invention will be better understood and objects other than those set forth above will become apparent when consideration is given to the following detailed description thereof.

Such description refers to the annexed drawings wherein.

DETAILED DESCRIPTION OF THE INVENTION

Figure 1:
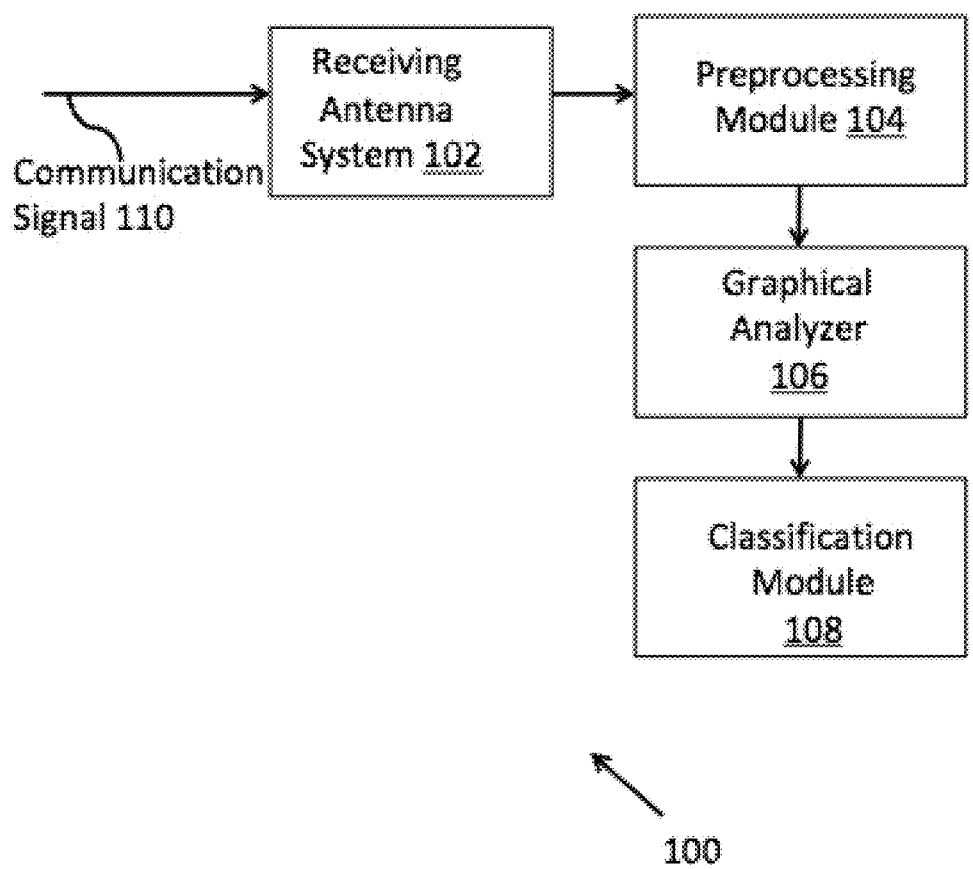
FIG. 1 depicts a block diagram of a system for classifying a modulation format of a communication signal, according to one of the preferred embodiments of the present invention.

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that the embodiments may be combined, or that other embodiments may be utilized, and that structural and logical changes may be made without departing from the spirit and scope of the present invention. The following detailed description is, therefore, not to be taken in a limiting sense, and the scope of the present invention is defined by the appended claims and their equivalents.

The present invention is described in brief with reference to the accompanying drawings. Now, refer in more detail to the exemplary drawings for the purposes of illustrating non-limiting embodiments of the present invention.

As used herein, the term "comprising" and its derivatives including "comprises" and "comprise" include each of the stated integers or elements but does not exclude the inclusion of one or more further integers or elements.

As used herein, the singular forms "a", "an", and "the" include plural referents unless the context clearly dictates otherwise. For example, reference to "a device" encompasses a single device as well as two or more devices, and the like.

As used herein, the terms "for example", "like", "such as", or "including" are meant to introduce examples that further clarify more general subject matter. Unless otherwise specified, these examples are provided only as an aid for understanding the applications illustrated in the present disclosure and are not meant to be limiting in any fashion.

As used herein, the terms ""may", "can", "could", or "might" be included or have a characteristic, that particular component or feature is not required to be included or have the characteristic.

Exemplary embodiments will now be described more fully hereinafter with reference to the accompanying drawings, in which exemplary embodiments are shown. These exemplary embodiments are provided only for illustrative purposes and so that this disclosure will be thorough and complete and will fully convey the scope of the invention to those of ordinary skill in the art. The invention disclosed may, however, be embodied in many different forms and should not be construed as limited to the embodiments set forth herein.

Various modifications will be readily apparent to persons skilled in the art. The general principles defined herein may be applied to other embodiments and applications without departing from the spirit and scope of the invention. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure). Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention.

Thus, for example, it will be appreciated by those of ordinary skill in the art that the diagrams, schematics, illustrations, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the technique being selectable by the entity implementing this invention. Those of ordinary skill in the art further understand that the exemplary hardware, software, processes, methods, and/or operating systems described herein are for illustrative purposes and, thus, are not intended to be limited to any named element.

Each of the appended claims defines a separate invention, which for infringement purposes is recognized as including equivalents to the various elements or limitations specified in the claims. Depending on the context, all references below to the "invention" may in some cases refer to certain specific embodiments only. In other cases, it will be recognized that references to the "invention" will refer to subject matter recited in one or more, but not necessarily all, of the claims.

All methods described herein can be performed in any suitable order unless otherwise indicated herein or otherwise clearly contradicted by context. The use of all examples, or exemplary language (e.g., "such as") provided with respect to certain embodiments herein is intended merely to better illuminate the invention and does not pose a limitation on the scope of the invention otherwise claimed. No language in the specification should be construed as indicating any non-claimed element essential to the practice of the invention.

Various terms as used herein are shown below. To the extent a term used in a claim is not defined below, it should be given the broadest definition and persons in the pertinent art have given that term as reflected in printed publications and issued patents at the time of filing.

Groupings of alternative elements or embodiments of the invention disclosed herein are not to be construed as limitations. Each group member can be referred to and claimed individually or in any combination with other members of the group or other elements found herein. One or more members of a group can be included in, or deleted from, a group for reasons of convenience and/or patentability. When any such inclusion or deletion occurs, the specification is herein deemed to contain the group as modified thus fulfilling the written description of all groups used in the appended claims.

The present invention provides a method and a system for modulation classification (MC) of radio communication signals. A modulation format of a received signal is determined from MC features that are extracted from an undirected graph of a function |Mb(n)|, where |Mb(n)| is a Fourier Transform of a bth power of a plurality of samples of the received signal. |Mb(n)| is defined as follows:

$$|M_b(n)| = |\mathcal{F}\{y^b(k)\}| \qquad \text{Equation 1}$$
$$= \left|\frac{1}{K}\sum_{k=0}^{K-1} y^b(k)e^{-j2\pi kn}\right|,$$

where y(k) is the $k_{th}$ received sample, k is the number of observed samples, and F{·} represents the discrete Fourier transform of each sample of the received signal.

Due to independence between transmitted symbols, as K tends to infinity, it is observed that $|M_b(n)|$ exhibits peaks at certain values of n, depending on a value of b and a modulation format of the signal. For example, $|M_2(n)|=|m_{20} \Upsilon|$ when the modulation format is Binary Phase Shift Keying (BPSK), where $m_{20}$ denotes second-order zero-conjugate moment of the transmitted modulated symbols and $\Upsilon \Upsilon$ depends on channel coefficients. Further, $|M_2(n)|=0$, when the modulation format is Quadrature Phase Shift Keying (QPSK) and 8 Phase shift keying (8PSK). Hence, $|M_2(n)|$ depends on the modulation format and exhibits peaks at n=0 for certain modulation types based on the value of b.

In order to determine the modulation format of the signal from the MC features that are extracted from an undirected graph, the undirected graph needs to be constructed. Typically, the undirected graph is constructed from the discrete samples $|M_b(n)|$, where n=0, 1 . . . N−1, by executing following three steps:

Step 1: Obtain a normalized sample $\overline{M}_b(n)$ for each discrete sample $|M_b|$, where the normalized sample is computed by executing equation (2) as shown below:

$$\tilde{M}_b(n) = \frac{|M_b(n)| - \min\{|M_b|\}}{\max\{|M_b|\} - \min\{|M_b|\}} \qquad \text{Equation (2)}$$

Step 2: Each normalized sample is quantized with several quantization levels (Q).

Step 3: Further, the undirected graph is constructed by tracing an amplitude of the quantized samples. Vertices of the undirected graph represent the amplitude of the quantized samples, whereas edges of the undirected graph represent a transition between amplitudes of consecutive quantized samples.

Several edges of the undirected graph are used as a measure of connectivity of the undirected graph. Based on an Erdos-Reny model of random graphs, in the absence of a significant peak in $|M_b(n)|$, b=1, 2, 4, the corresponding constructed graph Gb is connected, and the edges between each pair exists with probability $p>(1+\varepsilon) \ln(Q)/Q$, $\varepsilon \geq 0$. It may be noted that when p=0.5, the connectivity condition is fulfilled for any value of Q. As such, under hypothesis $H_0$ there are $$N_Q = \binom{Q}{2} = Q!/2!(Q-2)!$$

possible connections (edges) that may occur independently with probability $p>(1+\varepsilon) \ln(Q)/Q$, $\varepsilon \geq 0$. This implies that the number of edges, E, follows a binomial distribution with the probability density function (pdf)

$$p_\varepsilon(x) = \binom{N_Q}{x} p^x (1-p)^{N_Q - x}. \quad \text{Equation (3)}$$

Further, each undirected graph is constructed for each receiving antenna. Hence, in a MIMO system having multiple receiving antennas, multiple undirected graphs can be constructed. Furthermore, hypothesis $H_0$ is selected if the undirected graph is connected, else hypothesis $H_1$ is selected. Accordingly, a threshold η is set for a certain probability of false alarm (Pfa), where $P_{fa}=\Pr(E^{(v)} \leq \eta)|H_0)$, $\forall v, 0 \leq v \leq N_r - 1$. Typically, $P_{fa}$ is based on a binomial cumulative distribution function, as shown in Equation 4, below:

$$P_{fa} = 1 - \left(1 - \sum_{i=0}^{\lfloor \eta \rfloor} \binom{N_Q}{i} p^{N_Q}\right)^{N_r} \quad \text{Equation (4)}$$

where $\lfloor \cdot \rfloor$ is the floor function. Even though there is no closed-form expression for the threshold η, its value can be numerically calculated, e.g., using a bisection method as known in prior art. It may be noted that the MC feature such as graph connectivity, exists in the presence of timing and frequency offsets.

FIG. 1 depicts a system 100 deployed in a receiver of a communication system for determining modulation format of a communication signal 110. The system 100 includes a receiving antenna system 102, a preprocessing module 104, a graphical analyzer 106, and a classification module 108. The receiving antenna system 102 may be a single input single output (SISO) antenna system or a multiple input multiple output (MIMO) antenna system. Accordingly, the receiving antenna system 102 may include a single receiving antenna or multiple receiving antennas. The communication signal 110 maybe a radio communication signal received over a communication channel when transmitted by a transmit antenna at another end of a communication network. Alternate forms of communication signal 110 can also be envisaged.

The preprocessing module 104 evaluates a Fourier transform of a plurality of samples of the received communication signal 110, and normalizes each discrete sample of the Fourier transform by executing the below equation (2)

$$\tilde{M}_b(n) = \frac{|M_b(n)| - \min\{|M_b|\}}{\max\{|M_b|\} - \min\{|M_b|\}}$$

Further, the preprocessing module 104 quantizes each normalized sample based on several quantization levels (Q). The graphical analyzer 106 constructs an undirected graph by tracing amplitude of each quantized sample. Further, the classification module 108 extracts one or more modulation classification (MC) features from the undirected graph; and determines the modulation format of the received communication signal 110 based on the extracted MC features. The classification module 108 is further configured to extract a graph connectivity as a MC feature from the undirected graph. Furthermore, the classification module 108 classifies the modulation format into at least one predefined modulation format based on the extracted graph connectivity and a formulated binary hypothesis. In an embodiment, the least one predefined modulation format comprises a Binary Phase Shift Keying (BPSK), a Quadrature Phase Shift Keying (QPSK), a Frequency Shift Keying (FSK), and an 8 Phase Shift keying (8PSK). In an embodiment, the classification module selects a hypothesis $H_0$, when the graph connectivity is positive, wherein a positive value of the graph connectivity indicates the graph is connected. In an embodiment, the classification module selects a hypothesis $H_1$, when the graph connectivity is negative, wherein a negative value of the graph connectivity indicates the graph is not connected. The classification of the modulation format can be explained in reference to an example.

Figure 2A:
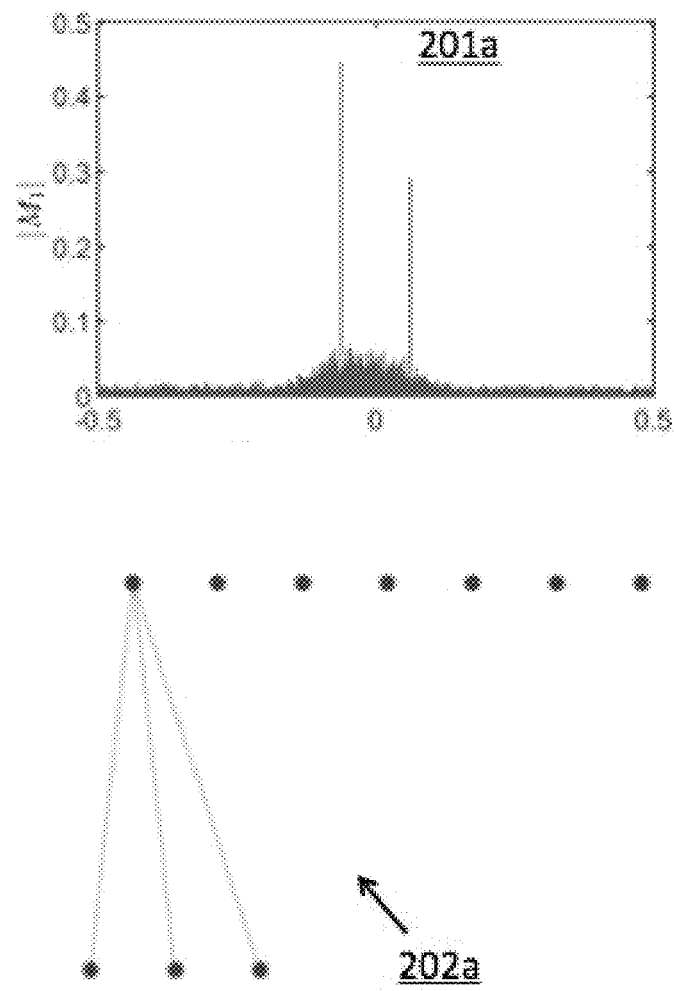
FIG. 2A to 2D depicts Fourier transform of a first order function of a communication signal and corresponding undirected graphs, according to one of the preferred embodiments of the present invention.
Figure 2B:
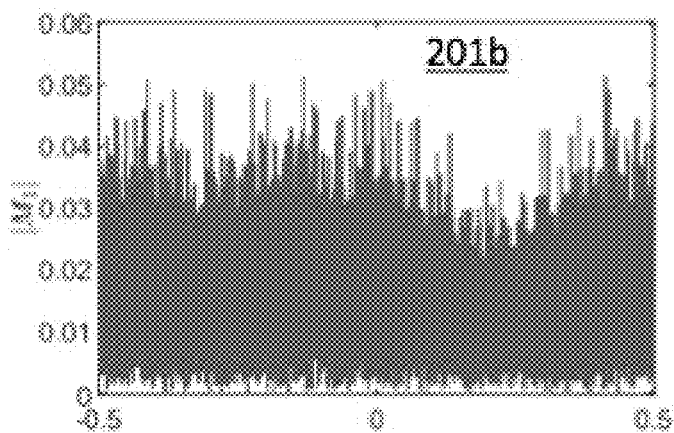
Figure 2B:
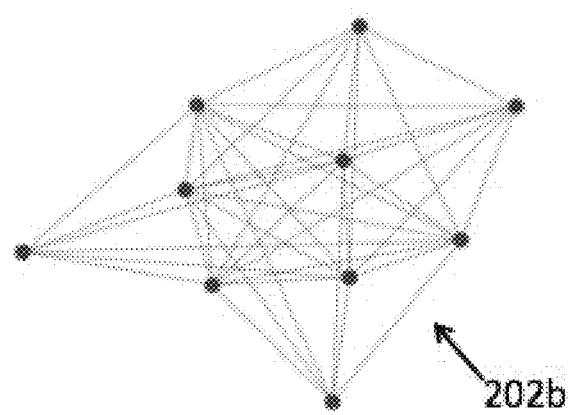
Figure 2C:
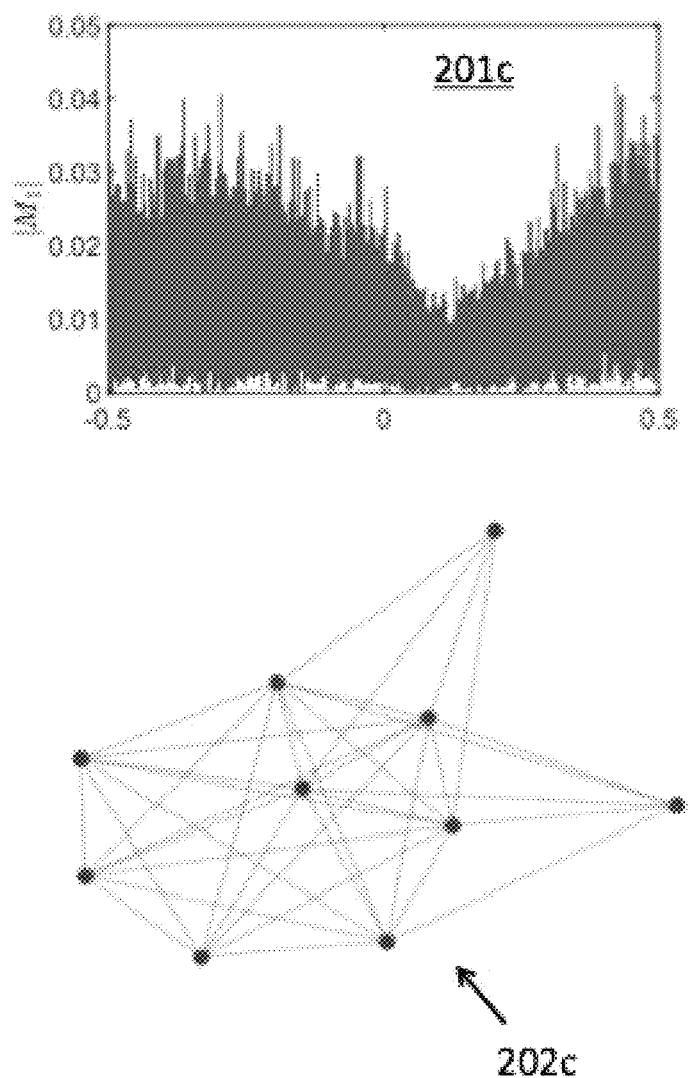
Figure 2D:
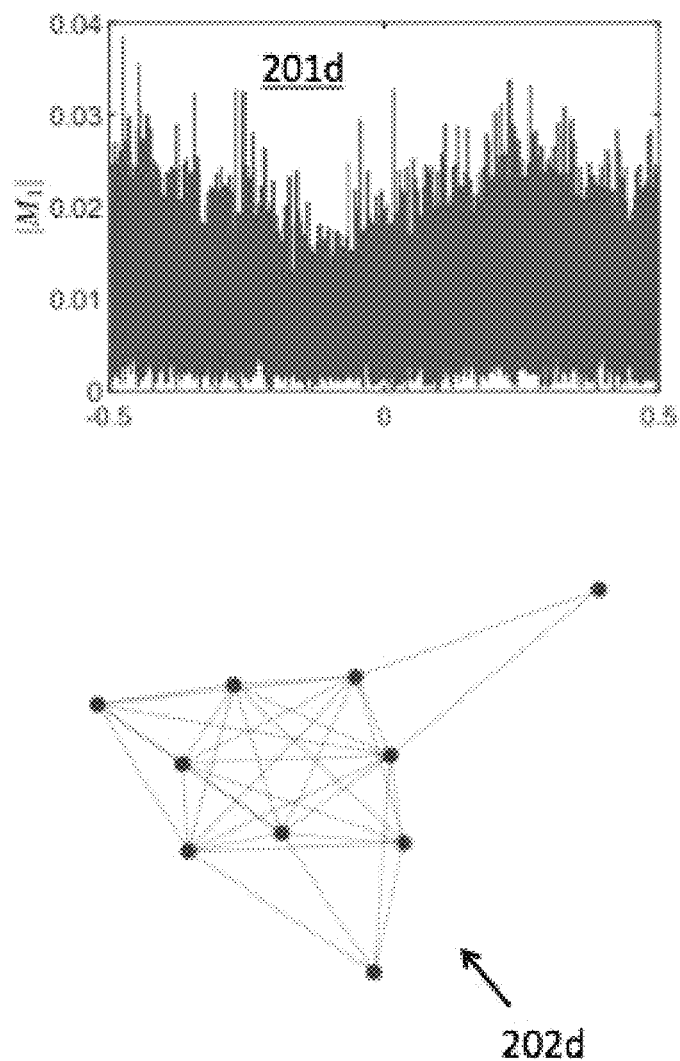

FIG. 2A to 2D, depicts Fourier transform of a communication signal drawn for $|M_1(n)|$ 201a for 2-FSK, $|M_1(n)|$ 201b for BPSK, $|M_1(n)|$ 201c for QPSK, and $|M_1(n)|$ 201d for 8-PSK, respectively with single transmit antenna, $N_t=1$, and single receive antenna, $N_r=1$, K=10,000 signal samples and 10 dB signal-to-noise ratio (SNR), over the ITU-R pedestrian fading channel. Corresponding undirected graphs $G_1$ 202a for 2-FSK, $G_1$ 202b for BPSK, $G_1$ 202c for QPSK and $G_1$ 202d for 8-PSK are also depicted. It can be observed in FIG. 2A, that $|M_1(n)|$ exhibits two peaks only for 2-FSK, while no peak exists for BPSK, QPSK and 8-PSK as seen in FIGS. 2B-2D respectively. The graphs $G_1$ 202b for BPSK, $G_1$ 202c for QPSK and $G_1$ 202d for 8-PSK are connected with no isolated vertices, due to absence of a peak in the corresponding $|M_1(n)|$.

Figure 3A:
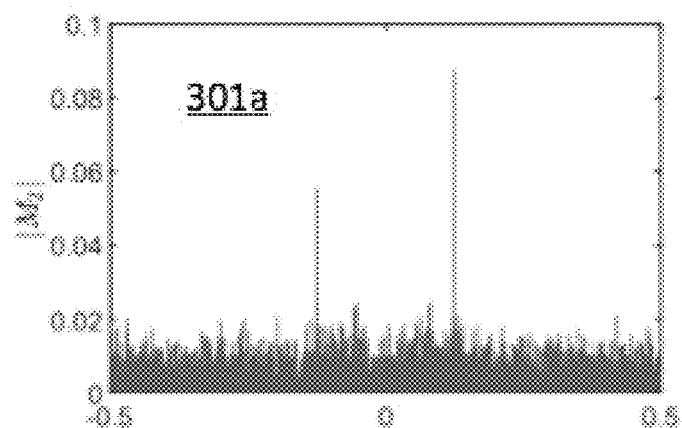
FIG. 3A to 3D depicts Fourier transform of a second order function of a communication signal and corresponding undirected graphs, according to one of the preferred embodiments of the present invention.
Figure 3A:
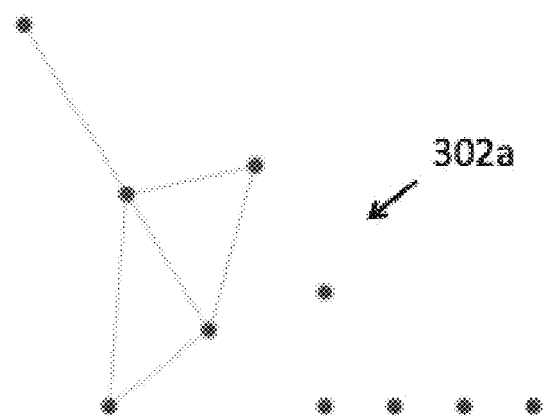
Figure 3B:
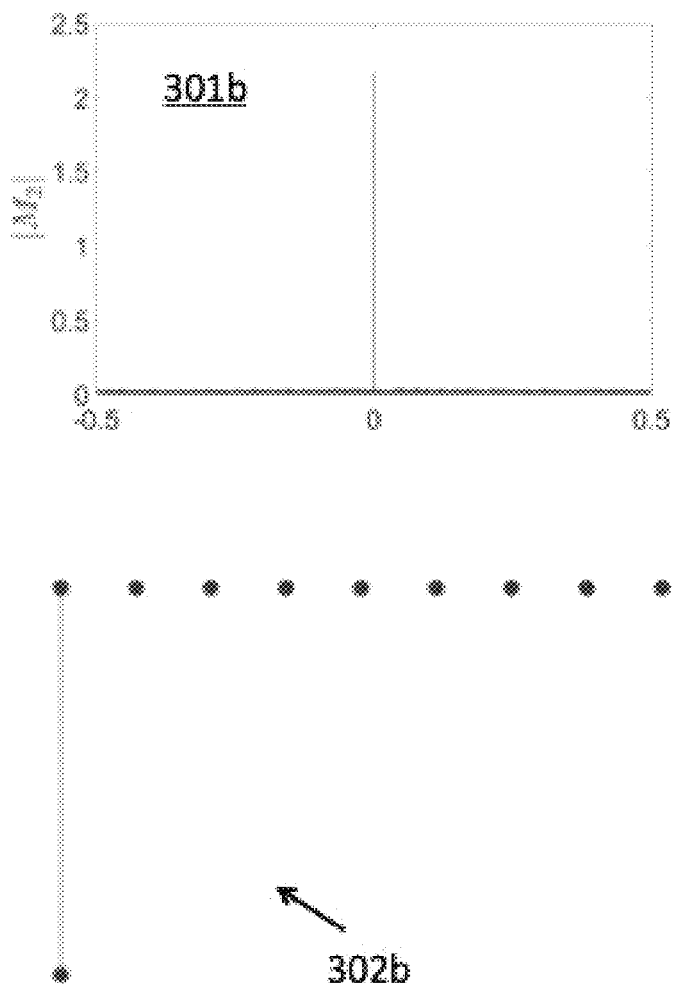
Figure 3C:
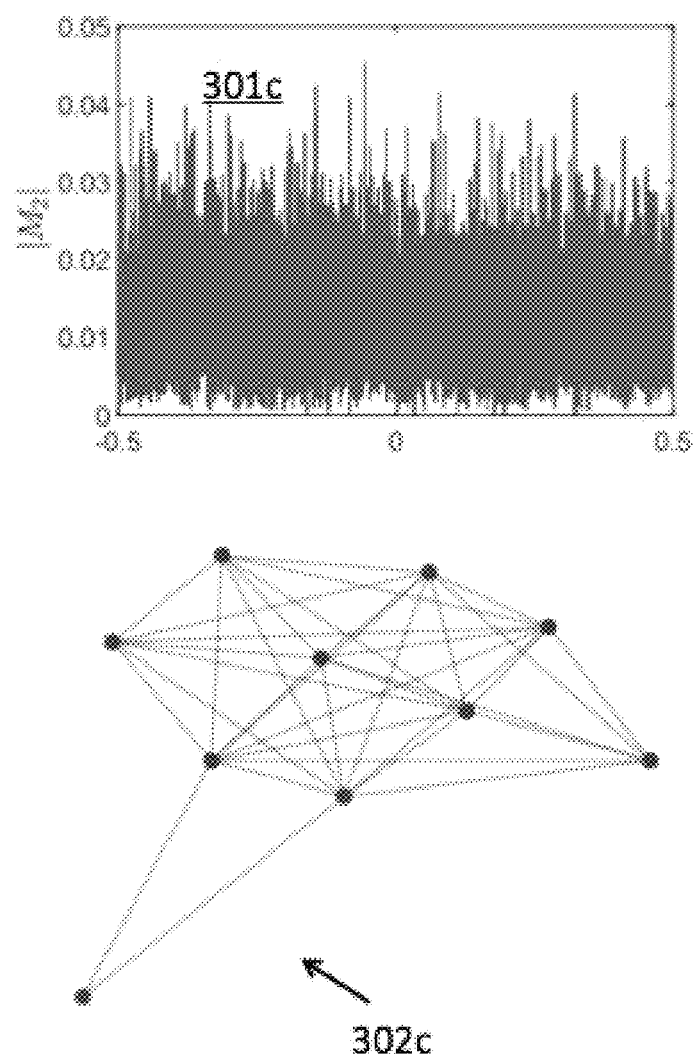
Figure 3D:
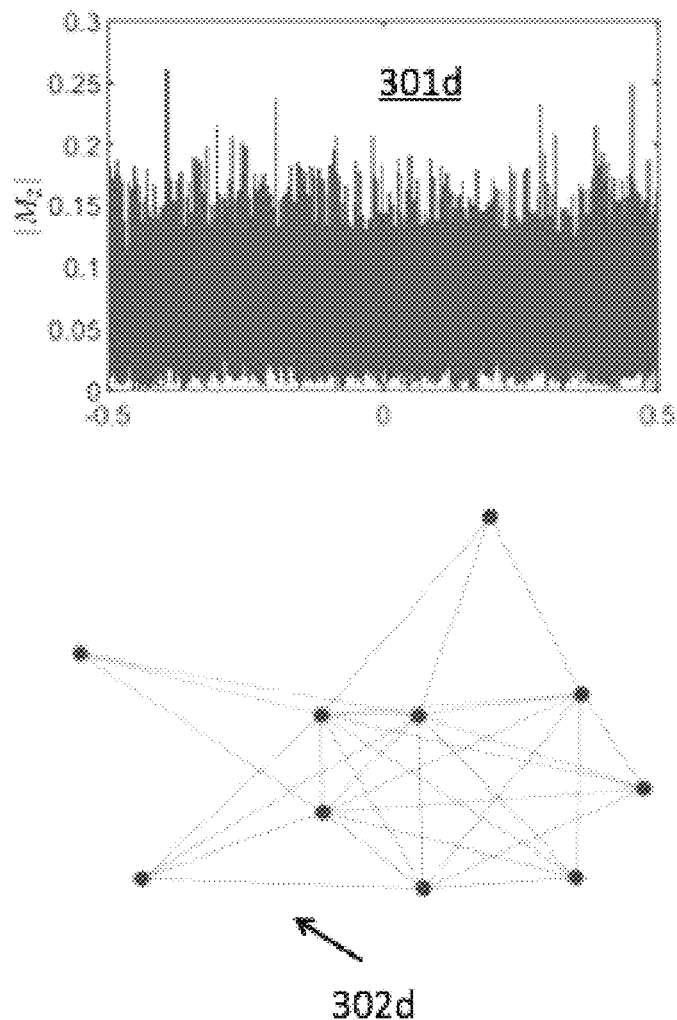

FIG. 3A to 3D illustrates Fourier transform mf a communication signal drawn for $|M_2(n)|$ 301a for 2-FSK, $|M_2(n)|$ 301b for BPSK, $|M_2(n)|$ 301c for QPSK, and $|M_2(n)|$ 301d for 8-PSK, respectively with single transmit antenna, $N_t=1$, and single receive antenna, $N_r=1$, K=10,000 signal samples and 10 dB signal-to-noise ratio (SNR), over the ITU-R pedestrian fading channel. Corresponding undirected graphs $G_2$ 302a for 2-FSK, $G_2$ 302b for BPSK, $G_2$ 302c for QPSK and $G_2$ 302d for 8-PSK are also depicted. It can be observed in FIG. 3B, that $|M_2(n)|$ exhibits two peaks for 2-FSK and BPSK, while no peak exists for QPSK and 8-PSK as seen in FIGS. 3C and 3D respectively. The graphs $G_2$ 302c for QPSK and $G_2$ 302d for 8-PSK are connected with no isolated vertices, due to absence of a peak in the corresponding $|M_2(n)|$.

Figure 4A:
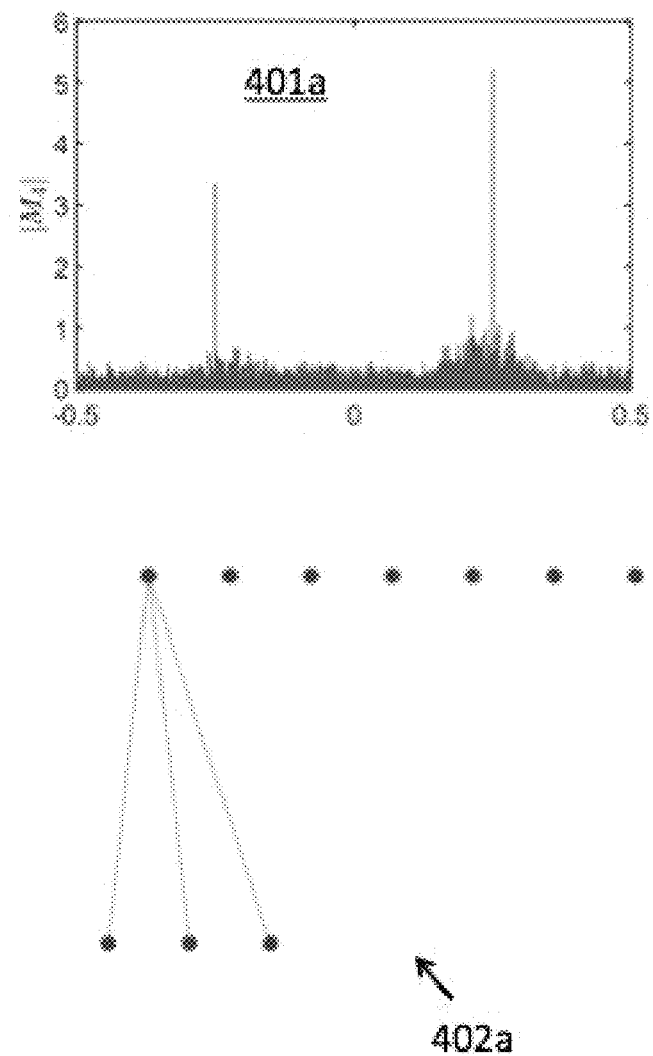
FIG. 4A to 4D depicts Fourier transform of fourth order function of a communication signal and corresponding undirected graphs, according to one of the preferred embodiments of the present invention.
Figure 4B:
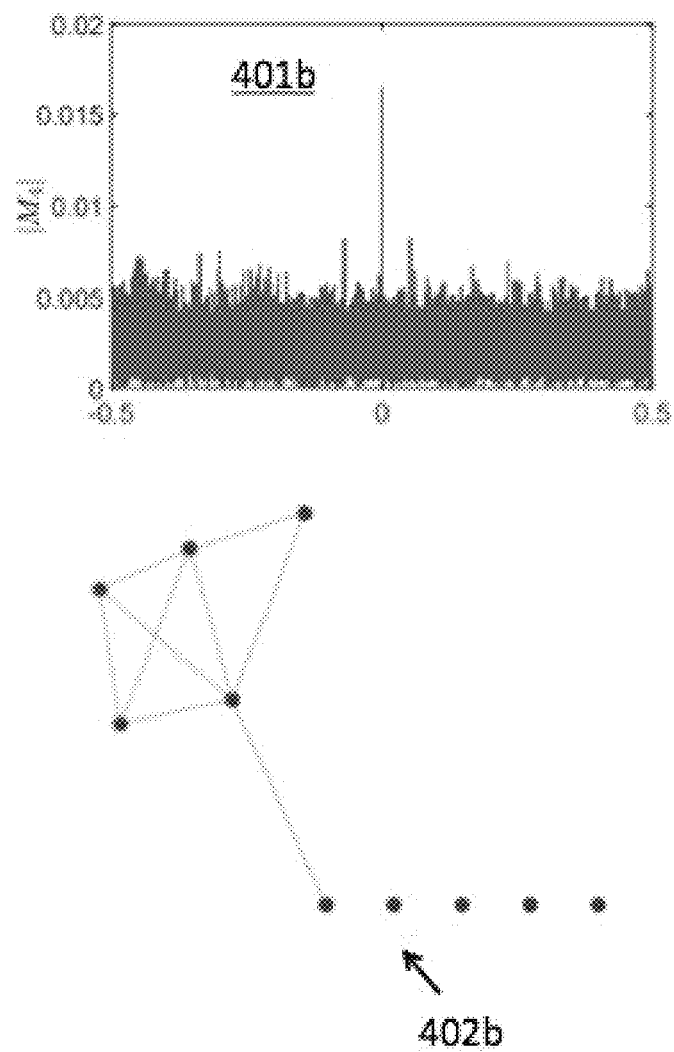
Figure 4C:
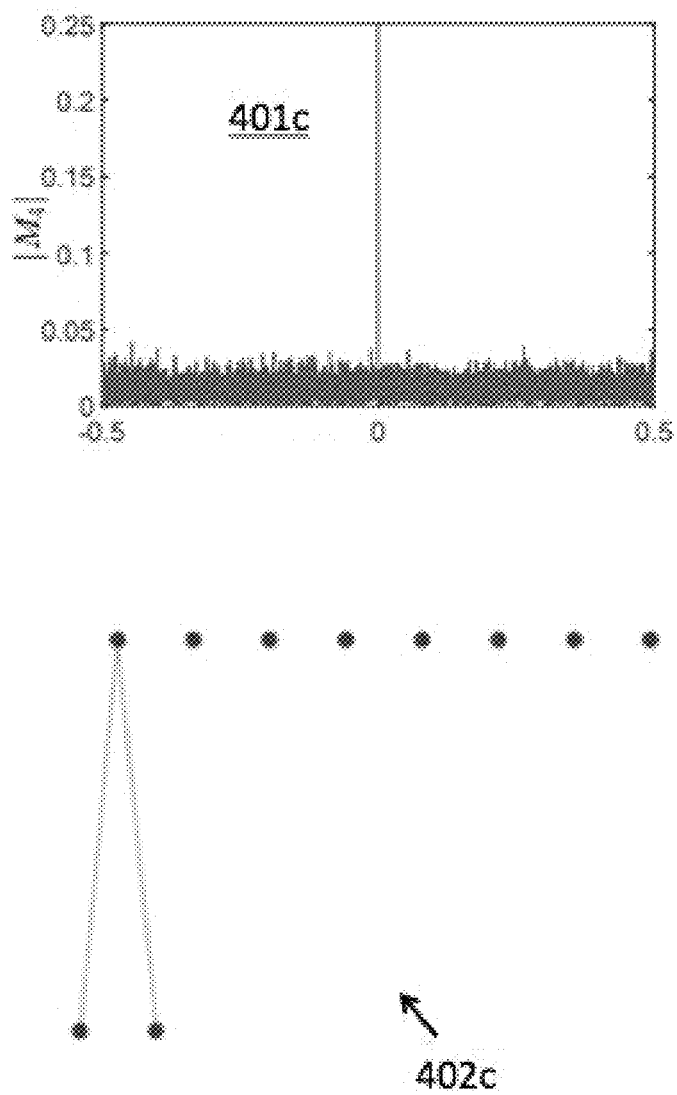
Figure 4D:
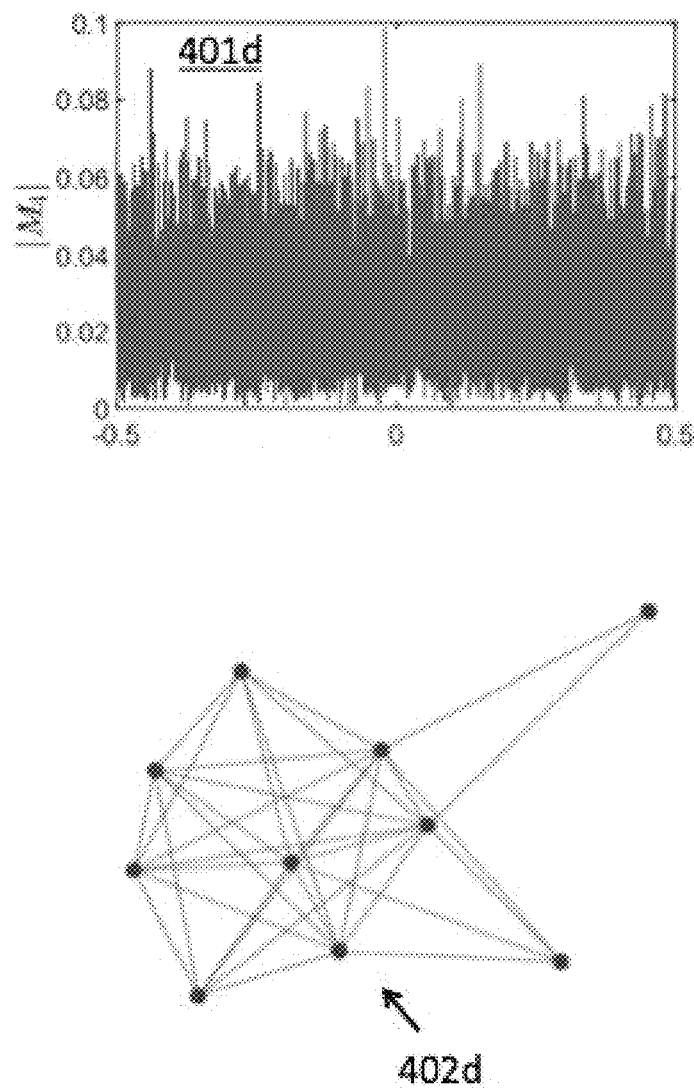

FIG. 4A to 4D illustrates Fourier transform mf a communication signal drawn for $|M_4(n)|$ 401a for 2-FSK, $|M_4(n)|$ 401b for BPSK, $|M_4(n)|$ 401c for QPSK, and $|M_4(n)|$ 401d for 8-PSK, respectively with single transmit antenna, $N_t=1$, and single receive antenna, $N_r=1$, K=10,000 signal samples and 10 dB signal-to-noise ratio (SNR), over the ITU-R pedestrian fading channel. Corresponding undirected graphs $G_4$ 402a for 2-FSK, $G_4$ 402b for BPSK, $G_4$ 402c for QPSK and $G_4$ 402d for 8-PSK are also depicted. It can be observed in FIG. 4C, that $|M_4(n)|$ exhibits a peak for QPSK, while no peak exists for 8-PSK as seen in FIG. 4D. The graphs $G_4$ 402d for 8-PSK is connected with no isolated vertices, due to absence of a peak in the corresponding $|M_4(n)|$.

Figure 5:
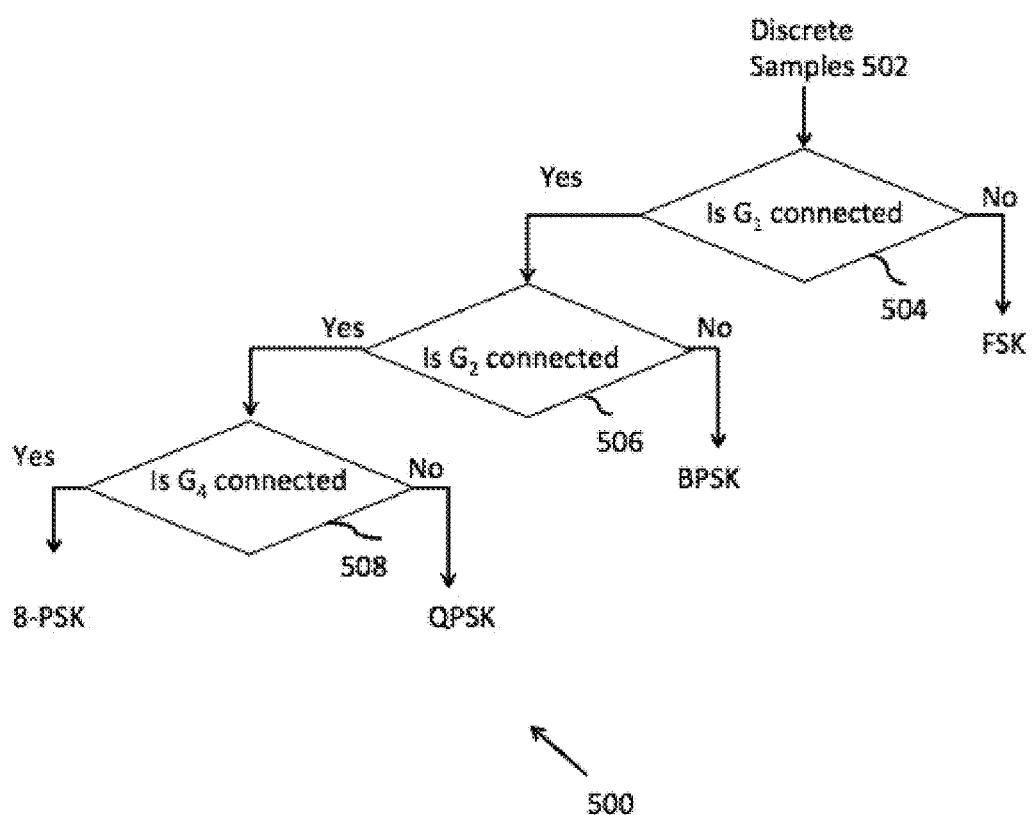
FIG. 5 depicts a decision tree followed to identifying a modulation format of a communication signal, according to one of the preferred embodiments of the present invention.

FIG. 5 illustrates decision tree 500 followed for classifying the modulation format of a communication signal. The decision tree 500 can be designed to classify the modulation format present in discrete samples 502 of a communication signal, into one of the following viz. FSK, BPSK, QPSK and 8-PSK by a formulated binary hypothesis. For example, FSK is declared to be present if undirected graph $G_1$ is not connected, as illustrated in decision box 504. Further, BPSK is declared as the modulation format of the communication signal if the graph $G_2$ is not connected, as illustrated in decision box 504. Further, QPSK is declared to be the modulation format if the graph $G_4$ is not connected, as illustrated in decision box 504, else 8-PSK is declared to be the modulation format.

Figure 6:
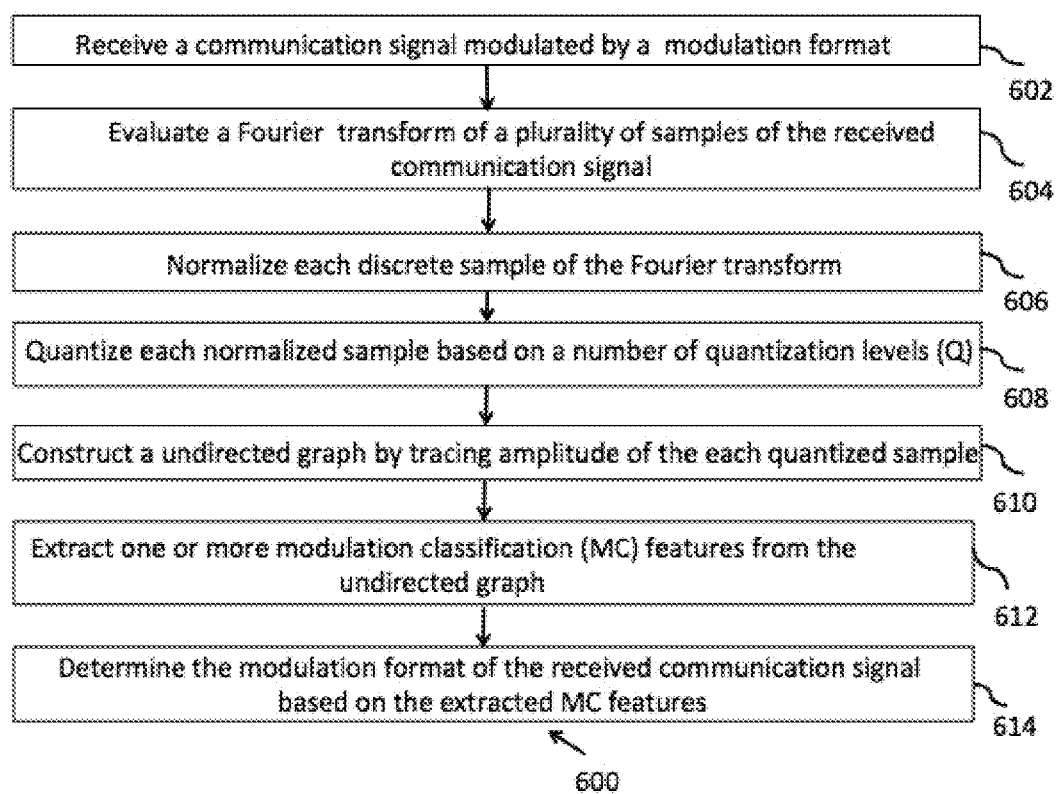
FIG. 6 is a flowchart illustrating a method for classifying a modulation format of a communication signal, according to one of the preferred embodiments of the present invention.

FIG. 6 is a flowchart 600 depicting a method for classifying modulation format of a communication signal, according to an embodiment of the present invention.

At 602, a communication signal modulated by a modulation format is received by a receiving antenna system. In an embodiment, the communication signal may be a radio communication signal and the receiving antenna system may be a SISO or a MIMO system. In an embodiment, the communication signal may be modulated by one or more schemes such a Frequency shift keying (FSK), M-ary FSK, Phase Shift Keying (PSK), Quadrature Phase Shift Keying (QPSK) and 8-PSK, and the like.

At 604, a Fourier transform of a plurality of samples of the received communication signal is evaluated by a preprocessing module.

At 606, each discrete sample of the Fourier transform of the communication signal, is normalized.

At 608, each normalized sample is quantized based on a number of quantization levels.

At 610, an undirected graph is constructed by a graphical analyzer present in the receiver from the each quantized sample. Each vertex of the undirected graph is quantized corresponds to amplitude of a quantized sample. Further, an edge of the graph represents a transition between amplitudes of a pair of quantized samples represented by the two vertices of the edge.

At 612, one or more modulation classification (MC) features can be extracted from the undirected graph. In an embodiment, graph connectivity is a MC feature that can be extracted.

At 614, a modulation format of the received communication signal is determined based on the extracted MC features. For example, if the graph connectivity is positive, it may indicate that the graph is connected. Further, a hypothesis may be simulated that a connected graph does not represent existence of a corresponding modulation format. Accordingly, a negative graph connectivity indicates that the graph is not connected, thereby indicating existence of peaks in the corresponding discrete representation of the signal. Existence of peaks indicate existence of a corresponding modulation format. Examples of modulation formats is explained in reference to FIGS. 2A-4D.

It is to be understood that the above description is intended to be illustrative, and not restrictive. For example, the above-discussed embodiments may be used in combination with each other. Many other embodiments will be apparent to those of skill in the art upon reviewing the above description.

The benefits and advantages which may be provided by the present invention have been described above with regard to specific embodiments. These benefits and advantages, and any elements or limitations that may cause them to occur or to become more pronounced are not to be construed as critical, required, or essential features of any or all of the embodiments.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention.

What is claimed is:

1. A method comprising:
   receiving, by a receiving antenna system, a communication signal modulated by a modulation format;
   evaluating, by a preprocessing module, a Fourier transform of the bth power of a plurality of samples of the received communication signal, where b is a positive integer;
   normalizing, by the preprocessing module, each discrete sample of the Fourier transform;
   quantizing, by the preprocessing module, each normalized sample based on a number of quantization levels (Q), wherein Q is a non-zero positive integer;
   constructing, by a graphical analyzer, an undirected graph by tracing amplitude of the each quantized sample;
   extracting, by a classification module, one or more modulation classification (MC) features from the undirected graph; and
   determining, by the classification module, the modulation format of the received communication signal based on the extracted MC features;
   wherein extracting, by the classification module, one or more MC features from the undirected graph, further comprises extracting a graph connectivity as a MC feature from the undirected graph.

2. The method of claim 1, wherein a vertex of the undirected graph represents an amplitude of a quantized sample.

3. The method of claim 2, wherein an edge of the undirected graph represents a transition between amplitudes of a pair of consecutive quantized samples.

4. The method of claim 3, wherein an edge between a pair of vertices exists with a probability $p > (1-\varepsilon) \ln(Q)/Q$, wherein $\varepsilon$ is greater than or equal to zero and less than one.

5. The method of claim 1, wherein a number of constructed undirected graphs is based on a number of receiving antennas in the receiving antenna system.

6. The method of claim 1, wherein the receiving antenna system is one of a single input single output (SISO) system and a multiple input multiple output (MIMO) system.

7. The method of claim 1, wherein determining, by the classification module, the modulation format of the received communication signal, further comprises:
   classifying the modulation format into at least one predefined modulation format based on the extracted graph connectivity and a formulated binary hypothesis.

8. The method of claim 7, wherein the at least one predefined modulation format comprises a Binary Phase Shift Keying (BPSK), a Quadrature Phase Shift Keying (QPSK), a Frequency Shift Keying (FSK), and an 8 Phase Shift keying (8PSK).

9. The method of claim 7, further comprising:
selecting, by the classification module, a hypothesis $H_0$, when the graph connectivity is positive, wherein a positive value of the graph connectivity indicates the undirected graph is connected; and
selecting, by the classification module, a hypothesis $H_1$, when the graph connectivity is negative, wherein a negative value of the graph connectivity indicates the undirected graph is not connected.

10. A system comprising:
a receiving antenna system configured to receive a communication signal modulated by a modulation format;
a preprocessing module configured to:
evaluate a Fourier transform of the bth power of a plurality of samples of the received communication signal, where b is a positive integer;
normalize each discrete sample of the Fourier transform;
quantize each normalized sample based on a number of quantization levels (Q), wherein Q is a non-zero positive integer;
a graphical analyzer configured to:
construct an undirected graph by tracing amplitude of the each quantized sample; and
a classification module configured to:
extract one or more modulation classification (MC) features from the undirected graph and extracting a graph connectivity as a MC feature from the undirected graph; and
determine the modulation format of the received communication signal based on the extracted MC features.

11. The system of claim 10, wherein a vertex of the undirected graph represents an amplitude of a quantized sample.

12. The system of claim 11, wherein an edge of the undirected graph represents a transition between amplitudes of a pair of consecutive quantized samples.

13. The system of claim 12, wherein an edge between a pair of vertices exists with a probability $p > (1-\varepsilon) \ln(Q)/Q$, wherein $\varepsilon$ is greater than or equal to zero and less than one.

14. The system of claim 10, wherein a number of constructed undirected graphs is based on a number of receiving antennas in the receiving antenna system.

15. The system of claim 10, wherein the receiving antenna system is one of a single input single output (SISO) system and a multiple input multiple output (MIMO) system.

16. The system of claim 10, wherein the classification module, is further configured to:
classify the modulation format into at least one predefined modulation format based on the extracted graph connectivity and a formulated binary hypothesis.

17. The system of claim 16, wherein the at least one predefined modulation format comprises a Binary Phase Shift Keying (BPSK), a Quadrature Phase Shift Keying (QPSK), a Frequency Shift Keying (FSK), and an 8 Phase Shift keying (8PSK).

18. The system of claim 16, further comprising:
selecting, by the classification module, a hypothesis $H_0$, when the graph connectivity is positive, wherein a positive value of the graph connectivity indicates the undirected graph is connected; and
selecting, by the classification module, a hypothesis $H_1$, when the graph connectivity is negative, wherein a negative value of the graph connectivity indicates the undirected graph is not connected.

* * * * *